(12) United States Patent
Neiger et al.

(10) Patent No.: US 7,305,592 B2
(45) Date of Patent: Dec. 4, 2007

(54) SUPPORT FOR NESTED FAULT IN A VIRTUAL MACHINE ENVIRONMENT

(75) Inventors: Gilbert Neiger, Portland, OR (US); Andrew V. Anderson, Hillsboro, OR (US); Steven M. Bennett, Hillsboro, OR (US); Jason Brandt, Austin, TX (US); Erik Cota-Robles, Portland, OR (US); Stalinselvaraj Jeyasingh, Beaverton, OR (US); Alain Kägi, Portland, OR (US); Sanjoy K. Mondal, San Marcos, TX (US); Rajesh Parthasarathy, Hillsboro, OR (US); Dion Rodgers, Hillsboro, OR (US); Lawrence O. Smith, Beaverton, OR (US); Richard A. Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 10/882,813

(22) Filed: Jun. 30, 2004

(65) Prior Publication Data

US 2006/0005084 A1    Jan. 5, 2006

(51) Int. Cl.
G06F 11/00    (2006.01)
(52) U.S. Cl. .......................... 714/48; 714/42
(58) Field of Classification Search .................. 714/48, 714/42, 54
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |

(Continued)

FOREIGN PATENT DOCUMENTS

DE    4217444    12/1992

(Continued)

OTHER PUBLICATIONS

Berg, Cliff, "How Do I Create a Signed Applet?", *Dr. Dobb's Journal*, (Aug. 1997), 1-9.

(Continued)

*Primary Examiner*—Dieu-Minh Le
(74) *Attorney, Agent, or Firm*—Blakely, Sokoloff, Taylor & Zafman LLP

(57) ABSTRACT

In one embodiment, information pertaining to a first fault occurring during operation of a virtual machine (VM) is stored in a first field. A second fault is detected while delivering the first fault to the VM, and a determination is made as to whether the second fault is associated with a transition of control to a virtual machine monitor (VMM). If this determination is positive, information pertaining to the second fault is stored in a second field, and control is transitioned to the VMM.

28 Claims, 4 Drawing Sheets

U.S. PATENT DOCUMENTS

| | | |
|---|---|---|
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 4,987,532 A * | 1/1991 | Noguchi ............ 712/228 |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A * | 4/1996 | Nakajima et al. ......... 718/100 |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |

| | | | | | |
|---|---|---|---|---|---|
| 6,339,816 B1 | 1/2002 | Bausch | EP | 1085396 | 3/2001 |
| 6,357,004 B1 | 3/2002 | Davis | EP | 1146715 | 10/2001 |
| 6,363,485 B1 | 3/2002 | Adams | EP | 1209563 | 5/2002 |
| 6,374,286 B1 | 4/2002 | Gee et al. | EP | 1271277 | 1/2003 |
| 6,374,317 B1 | 4/2002 | Ajanovic et al. | JP | 2000076139 | 3/2000 |
| 6,378,068 B1 | 4/2002 | Foster | WO | WO9524696 | 9/1995 |
| 6,378,072 B1 | 4/2002 | Collins et al. | WO | WO9729567 | 8/1997 |
| 6,389,537 B1 | 5/2002 | Davis et al. | WO | WO9812620 | 3/1998 |
| 6,397,242 B1 | 5/2002 | Devine et al. | WO | WO9834365 | 8/1998 |
| 6,397,379 B1 | 5/2002 | Yates, Jr. et al. | WO | WO9844402 | 10/1998 |
| 6,412,035 B1 | 6/2002 | Webber | WO | WO9905600 | 2/1999 |
| 6,421,702 B1 | 7/2002 | Gulick | WO | WO9918511 | 4/1999 |
| 6,435,416 B1 | 8/2002 | Slassi | WO | WO9957863 | 11/1999 |
| 6,445,797 B1 | 9/2002 | McGough et al. | WO | WO9965579 | 12/1999 |
| 6,463,535 B1 | 10/2002 | Drews et al. | WO | WO0021238 | 4/2000 |
| 6,463,537 B1 | 10/2002 | Tello | WO | WO0062232 | 10/2000 |
| 6,499,123 B1 | 12/2002 | McFarland et al. | WO | WO0127723 | 4/2001 |
| 6,505,279 B1 | 1/2003 | Phillips et al. | WO | WO0127821 | 4/2001 |
| 6,507,904 B1 | 1/2003 | Ellison et al. | WO | WO0163994 | 8/2001 |
| 6,529,909 B1 | 3/2003 | Bowman-Amuah | WO | WO0175565 | 10/2001 |
| 6,535,988 B1 | 3/2003 | Poisner | WO | WO0175595 | 10/2001 |
| 6,557,104 B2 | 4/2003 | Vu et al. | WO | WO0201794 | 1/2002 |
| 6,560,627 B1 | 5/2003 | McDonald et al. | WO | WO9909482 | 1/2002 |
| 6,609,199 B1 | 8/2003 | DeTreville | WO | WO0217555 | 2/2002 |
| 6,615,278 B1 | 9/2003 | Curtis | WO | WO02060121 | 8/2002 |
| 6,633,963 B1 | 10/2003 | Ellison et al. | WO | WO0175564 | 10/2002 |
| 6,633,981 B1 | 10/2003 | Davis | WO | WO02086684 | 10/2002 |
| 6,651,171 B1 | 11/2003 | England et al. | WO | WO03058412 | 7/2003 |
| 6,678,825 B1 | 1/2004 | Ellison et al. | | | |
| 6,684,326 B1 | 1/2004 | Cromer et al. | | | |
| 6,782,424 B2* | 8/2004 | Yodaiken ............... 709/224 | | | |
| 6,996,748 B2* | 2/2006 | Uhlig et al. ............ 714/38 | | | |
| 7,082,598 B1* | 7/2006 | Le et al. ............... 717/127 | | | |
| 7,124,327 B2* | 10/2006 | Bennett et al. ......... 714/38 | | | |
| 2001/0021969 A1 | 9/2001 | Burger et al. | | | |
| 2001/0027511 A1 | 10/2001 | Wakabayashi et al. | | | |
| 2001/0027527 A1 | 10/2001 | Khidekel et al. | | | |
| 2001/0037450 A1 | 11/2001 | Metlitski et al. | | | |
| 2002/0007456 A1 | 1/2002 | Peinado et al. | | | |
| 2002/0023032 A1 | 2/2002 | Pearson et al. | | | |
| 2002/0147916 A1 | 10/2002 | Strongin et al. | | | |
| 2002/0166061 A1 | 11/2002 | Falik et al. | | | |
| 2002/0169717 A1 | 11/2002 | Challener | | | |
| 2003/0018892 A1 | 1/2003 | Tello | | | |
| 2003/0074548 A1 | 4/2003 | Cromer et al. | | | |
| 2003/0115453 A1 | 6/2003 | Grawrock | | | |
| 2003/0126442 A1 | 7/2003 | Glew et al. | | | |
| 2003/0126453 A1 | 7/2003 | Glew et al. | | | |
| 2003/0159056 A1 | 8/2003 | Cromer et al. | | | |
| 2003/0188179 A1 | 10/2003 | Challener et al. | | | |
| 2003/0196085 A1 | 10/2003 | Lampson et al. | | | |
| 2004/0003323 A1 | 1/2004 | Bennett et al. | | | |
| 2004/0003324 A1 | 1/2004 | Uhlig et al. | | | |
| 2004/0117539 A1 | 6/2004 | Bennett et al. | | | |
| 2004/0172574 A1* | 9/2004 | Wing et al. ............ 714/4 | | | |
| 2005/0060703 A1* | 3/2005 | Bennett et al. ........ 718/1 | | | |
| 2005/0076155 A1* | 4/2005 | Lowell .................. 710/1 | | | |
| 2005/0172305 A1* | 8/2005 | Baumberger ........... 719/327 | | | |
| 2005/0240819 A1* | 10/2005 | Bennett et al. ........ 714/34 | | | |
| 2006/0015869 A1* | 1/2006 | Neiger et al. ......... 718/1 | | | |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |

OTHER PUBLICATIONS

Brands, Stefan, "Restrictive Blinding of Secret-Key Certificates", *Springer-Verlag XP002201306*, (1995), Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999), 209-221.

Compaq Computer Corporation, "Trusted Computing Platform Alliance (TCPA) Main Specification Version 1.1a", XP002272822, (Jan. 25, 2001),1-321.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86 )*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing",Fabry, R.S., *"Capability-Based Addressing,"* Communications of the ACM, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *Computer Magazine*, (Jun. 1974), 34-35.

Gong, Li, et al., "Going Beyond the Sandbox: An Overview of the New Security Architecture in the Java Development Kit 1.2", *Proceedings of the USENIX Symposium on Internet Technologies and Systems*, Monterey, CA, (Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993), 61-97.

HP Mobile Security Overview, "HP Mobile Security Overview", (Sep. 2002), 1-10.

IBM, "Information Display Technique for a Terminate Stay Resident Program IBM Technical Disclosure Bulletin", TDB-ACC-No. NA9112156, vol. 34, Issue 7A, (Dec. 1, 1991), 156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004, (Jul. 2, 2002), 1-6.

INTEL, "IA-32 Intel Architecture Software Developer's Manual", vol. 3: *System Programming Guide*, Intel Corporation—2003,13-1 through 13-24.

INTEL, "Intel386 DX Microprocessor 32-Bit CHMOS Microprocessor With Integrated Memory Management", (1995), 5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput, Soc, US, USBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614, (Mar. 1999).

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997), 475.

Nanba, S., et al., "VM/4: ACOS-4 Virtual Machine Architecture", *VM/4: ACOS-4 Virtual Machine Architecture, IEEE*, (1985),171-178.

Richt, Stefan, et al., "In-Circuit-Emulator Wird Echtzeittauglich", *Elektronic, Franzis Verlag GMBH, Munchen, DE*, vol. 40, No. 16, XP000259620, (100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado. (Aug. 14, 2000),1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099, (Oct. 1995),47-52.

Schneier, Bruce, "Applied Cryptography: Protocols, Algorithm, and Source Code in C", *Wiley, John & Sons, Inc.*, XP00238607; ISBN 0471117099, (Oct. 1995),56-65.

Schneier, Bruce, "Applied Cryptography: Protocols, Algorithm, and Source Code in C", *Wiley, John & Sons, Inc.*, XP0021111449; ISBN 0471117099, (Oct. 1995),169-187.

Schneier, Bruce, "Applied Cryptography: Protocols, Algorithm, and Source Code in C", *2nd Edition; Wiley, John & Sons, Inc.*, XP002251738; ISBN 0471128457, (Nov. 1995), 28-33; 176-177; 216-217; 461-473; 518-522.

Sherwood, Timothy, et al., "Patchable Instruction ROM Architecture", *Department of Computer Science and Engineering, University of California*, San Diego, La Jolla, CA, (Nov. 2001).

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

Search Report dated Mar. 16, 2007, PCT/US2005/020464, 6 pages.

MOTOROLA, "M68040 User's Manual", (1993), 1-1 to 8-32.

RSA Security, "Hardware Authenticators", www.rsasecurity.com/node.asp?id=1158, 1-2, unknown date.

RSA Security, "RSA SecurID Authenticators", www.rsasecurity.com/products/securid/datasheets/SID_DS_0103.pdf, 1-2, unknown date.

RSA Security, "Software Authenticators", www.srasecurity.com/node.asp?id=1313, 1-2, unknown date.

* cited by examiner

SUPPORT FOR NESTED FAULT IN A VIRTUAL MACHINE ENVIRONMENT

FIELD

Embodiments of the invention relate generally to virtual machines, and more specifically to providing support for nested faults in a virtual machine environment.

BACKGROUND

An interrupt or an exception signals a processor that some special internal or external condition requires attention. Upon receiving such a signal, a processor suspends the current process and starts executing a routine to handle the special condition. This routine is referred to as a handler. The handler's task typically consists of determining the source and cause of the special condition, handling of the condition, and resuming the suspended process (if the process has not been terminated).

To help the software identify the cause of an interrupt or exception quickly, each special condition may be assigned a distinct number called a vector or vector number. This assignment is part of a given processor instruction set architecture (ISA). For example, the ISA of the Intel® Pentium® 4 (referred to herein as the IA-32 ISA) assigns a vector number to each exception (e.g., vector 0 corresponds to a divide error and vector 14 corresponds to a page fault), but leaves open the vector assignment of interrupts (e.g., interrupts generated by the network interface hardware).

To speed up interrupt and exception processing, an architecture may define a structure, called the interrupt descriptor table (IDT), which holds an entry per vector. Each entry contains a descriptor (e.g., an interrupt gate, trap gate or task gate in the IA-32 ISA) specifying the location of the corresponding handler. This design allows software to install distinct handlers for each interrupt or exception that has been assigned a vector. Some ISAs may utilize a single vector for all exceptions and/or interrupts.

When the processor detects a special condition, it fetches the IDT entry corresponding to the current condition and determines the pointer to the beginning of the associated handler. In ISAs utilizing a single vector for all exceptions and/or interrupts, no indexing of an IDT is required; the pointer to the beginning of the associated handler is determined from the single vector. The processor next saves the state of the process currently running (e.g., its instruction pointer), and jumps to the beginning of the handler using the extracted pointer. This process is referred to as delivering a fault.

In some ISAs, for some kinds of exceptions, an error code may be pushed onto the stack prior to jumping to the beginning of the handler. Alternatively, an eror code may be provided in a hardware register, one or more memory locations, or using some other means. The error code provides to the handler additional information regarding the exceptional condition (e.g., an identifier for a faulting segment register).

In some ISAs, exceptions may occur while delivering interrupts or exceptions. For example, in the IA-32 ISA, the processor may encounter a number of exceptions during delivery of the interrupt or exception to the handler, such as a page fault resulting from the page where the IDT resides being marked not present in the page tables. In this case, the processor delivers a page-fault exception instead of the interrupt.

BRIEF DESCRIPTION OF THE DRAWINGS

The invention may be best understood by referring to the following description and accompanying drawings that are used to illustrates embodiments of the invention. In the drawings.

DESCRIPTION OF EMBODIMENTS

Figure 1:
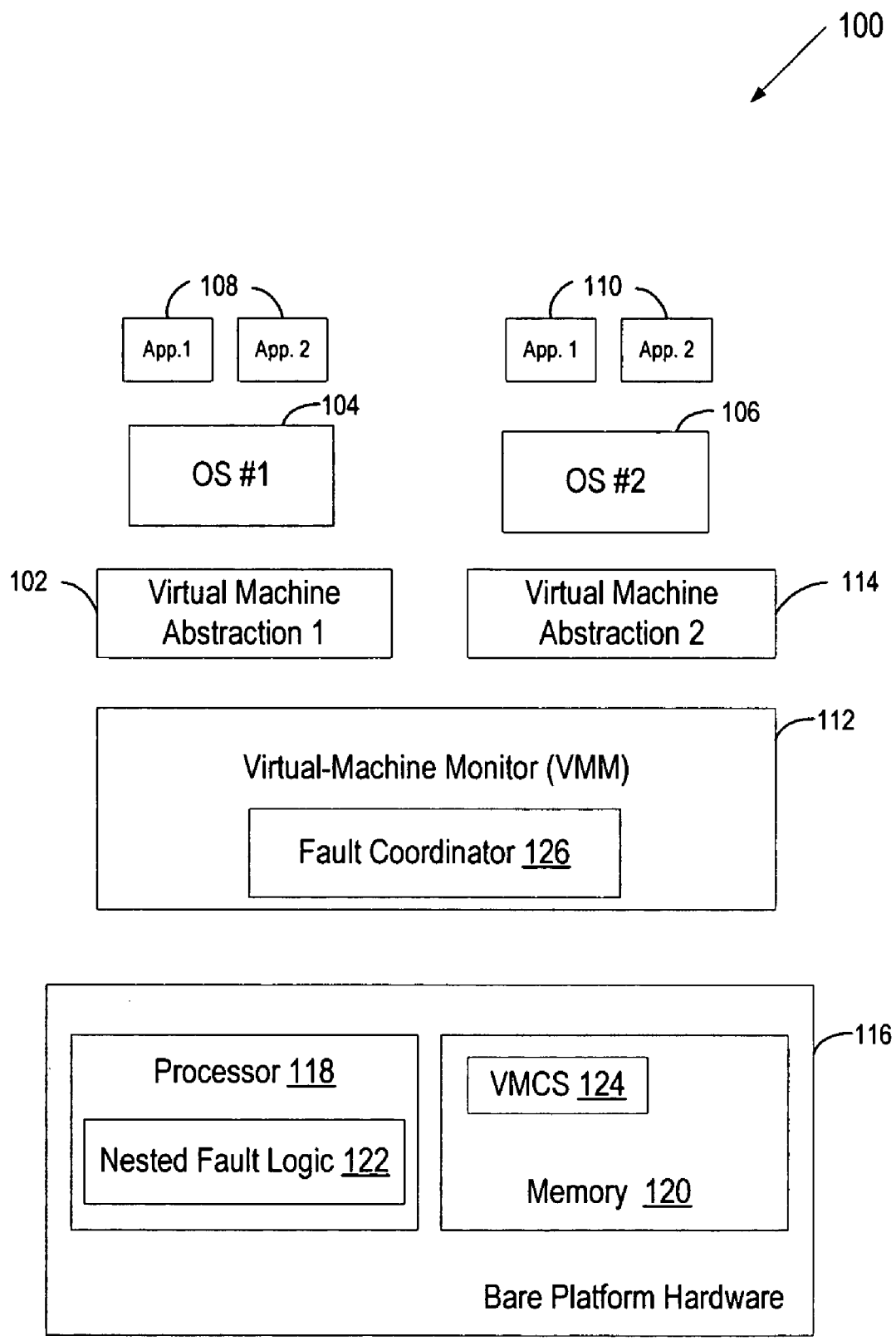
FIG. 1 illustrates one embodiment of a virtual-machine environment, in which some embodiments of the present invention may operate.

A method and apparatus for providing support for nested faults in a virtual machine environment are described. In the following description, for purposes of explanation, numerous specific details are set forth. It will be apparent, however, to one skilled in the art that embodiments of the invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

Although the below examples may describe support for nested faults in a virtual machine environment in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Although FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expect to access physical resources (e.g., processor registers, memory and I/O devices) within the VMs 102 and 114 on which the guest OS 104 or 106 is running and to perform other functions. For example, the guest OS expects to have access to all registers, caches, structures, I/O devices, memory and the like, according to the architecture of the processor and platform presented in the VM.

The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various fault events such as exceptions (e.g., page faults, general protection faults, traps, aborts, etc.), interrupts (e.g., hardware interrupts, software interrupts), and platform events (e.g., initialization (INIT) and system management interrupts (SMIs)). Some of these fault events are "privileged" because they must be handled by the VMM 112 to ensure proper operation of VMs 102 and 114 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain state of the guest software, state of the VMM 112, execution control information indicating how the VMM 112 wishes to control operation of guest software, information controlling transitions between the VMM 112 and a VM, etc. The processor 118 reads information from the VMCS 124 to determine the execution environment of the VM and to constrain its behavior. In one embodiment, the VMCS 124 is stored in memory 120. In some embodiments, multiple VMCS structures are used to support multiple VMs.

When a fault event occurs during the operation of a VM, the processor 118 determines whether this fault event is associated with a VM exit (i.e., whether an execution control indicator associated with this fault is set to a VM exit value to cause a VM exit for this fault). If the fault event is associated with a VM exit, the processor 118 generates a VM exit to the VMM 112, indicating that the VM exit was caused by the fault event. The VMM 112 may then decide to handle the fault itself or request the processor 118 to deliver the fault to an appropriate VM.

In one embodiment, delivering of the fault involves searching a redirection structure for an entry associated with the fault being delivered, extracting from this entry a descriptor of the location of a routine designated to handle this fault, and jumping to the beginning of the routine using the descriptor. Routines designated to handle corresponding interrupts, exceptions or any other faults are referred to as fault handlers. In another embodiment, delivering of the fault does not require searching a redirection structure. In such an embodiment, the descriptor of the location of the fault handling routine may be included in a single entry (e.g., configurable by software) or hardcoded (e.g., at a fixed location in memory).

Delivery of a fault may require the performance of one or more address translations, converting an address from a virtual to physical form. For example, the address of the interrupt table or the address of the associated handler may be a virtual address. The processor may also need to perform various checks during the delivery of a fault. For example, the processor may perform consistency checks such as validation of segmentation registers and access addresses (resulting in limit violation faults, segment-not-present faults, stack faults, etc.), permission level checks that may result in protection faults (e.g., general-protection faults), etc.

Address translations and checking during fault delivery may result in a variety of faults, such as page faults, general protection faults, etc. Such a nested fault must be delivered to the appropriate handler. The delivery of the new, nested fault may also result in a fault. Depending on an ISA, such fault nesting may continue until it reaches a maximum allowed nested fault level, at which the processor 118 brings the VM to a shutdown state. In the IA-32 ISA, for example, a triple fault causes the processor to bring the VM to a shutdown state. Various events may cause the VM to leave the shutdown state. For example, in the IA-32 ISA, when the processor is in the triple fault shutdown state, system initialization messages (INITs), non-maskable interrupts (NMIs), machine check exceptions, and system-management interrupts (SMIs) cause the processor to leave the shutdown state.

Delivery of a fault to a VM may be performed by the processor 118, or by another entity such as VMM 112. The processor 118 may provide facilities for VMM 112 to deliver a fault to a VM as a part of a VM entry to the VM, removing the necessity for the VMM 112 to emulate this behavior.

In one embodiment, the processor 118 includes nested fault logic 122 that is responsible for tracking fault nesting and capturing information pertaining to faults occurring at various levels. This fault-nesting information may subsequently be used by the VMM 112 once a nested fault causes a VM exit. In one embodiment, the VMM 112 includes a fault coordinator 126 that is responsible for coordinating handling of nested faults based on the fault nesting information. For example, if a page fault owned by the VMM 112 occurs during the delivery of an original interrupt (e.g., if the VMM 112 uses a physical memory virtualization algorithm to protect and partition physical memory among the VMs and the page where the IDT resides in physical memory is not mapped by the page tables), such an induced page fault causes a VM exit to the VMM 112. The fault coordinator 126 of the VMM 112 then resolves the induced page fault, returns control to the VM and reinitiates the delivery of the original interrupt (or otherwise emulate its delivery). The fault coordinator 126 determines that it needs to return control to the VM and to reinitiate the delivery of the original interrupt based on the details about the original interrupt in the fault nesting information.

In one embodiment, the nested fault logic 122 captures information about nested faults using a set of fields corresponding to various nesting levels. In one embodiment, fault information is captured for each of the allowed nesting levels. For example, if four nesting levels are allowed, the fault information is captured for each of the four levels. In one embodiment, the fault information includes fault identifying information such as a fault identifier and a fault type (e.g., external interrupt, internal interrupt, non-maskable interrupt (NMI), exception, etc.). In another embodiment, in which a fault is associated with an error code that needs to be pushed onto a stack (or provided in a hardware register or via other means) prior to jumping to the beginning of the handler, the fault information also includes an error code. In this embodiment, the set of nested fault fields may include two or more fields for each allowed nesting level: one field for fault identifying information and the other field(s) for the error code or other information pertaining to the fault.

In an alternative embodiment, the fault information is captured only for two most recent faults. For example, if four nesting levels are allowed and nested faults occur at each allowed nesting level without causing a VM exit at any of the first three levels, the fault information is reported to the VMM only for faults associated with levels 3 and 4 (i.e., the two most recently encountered faults). Again, for each of the two most recent levels, the fault information includes fault identifying information such as a fault identifier and a fault type, and, in one embodiment, also an error code associated with the fault. The loss of fault information for earlier faults may place requirements on the VMM to configure operation of VMs to cause VM exits for more types of faults to avoid the loss of nested fault information because the loss of fault information may make restarting of the VM difficult or impossible.

One or more storage locations are available to store fault information. In one embodiment, these locations are in the VMCS 124. Alternatively, these locations may be in the processor 118, the memory 120, a combination of the memory 120 and the processor 118, or in any other storage location or locations.

One set of the storage locations available to store fault information for a single fault is referred to herein as a fault information field, or simply a field (even though more than one storage location may exist such as, for example, a storage location for fault identifying information and a storage location for the error code).

Figure 2:
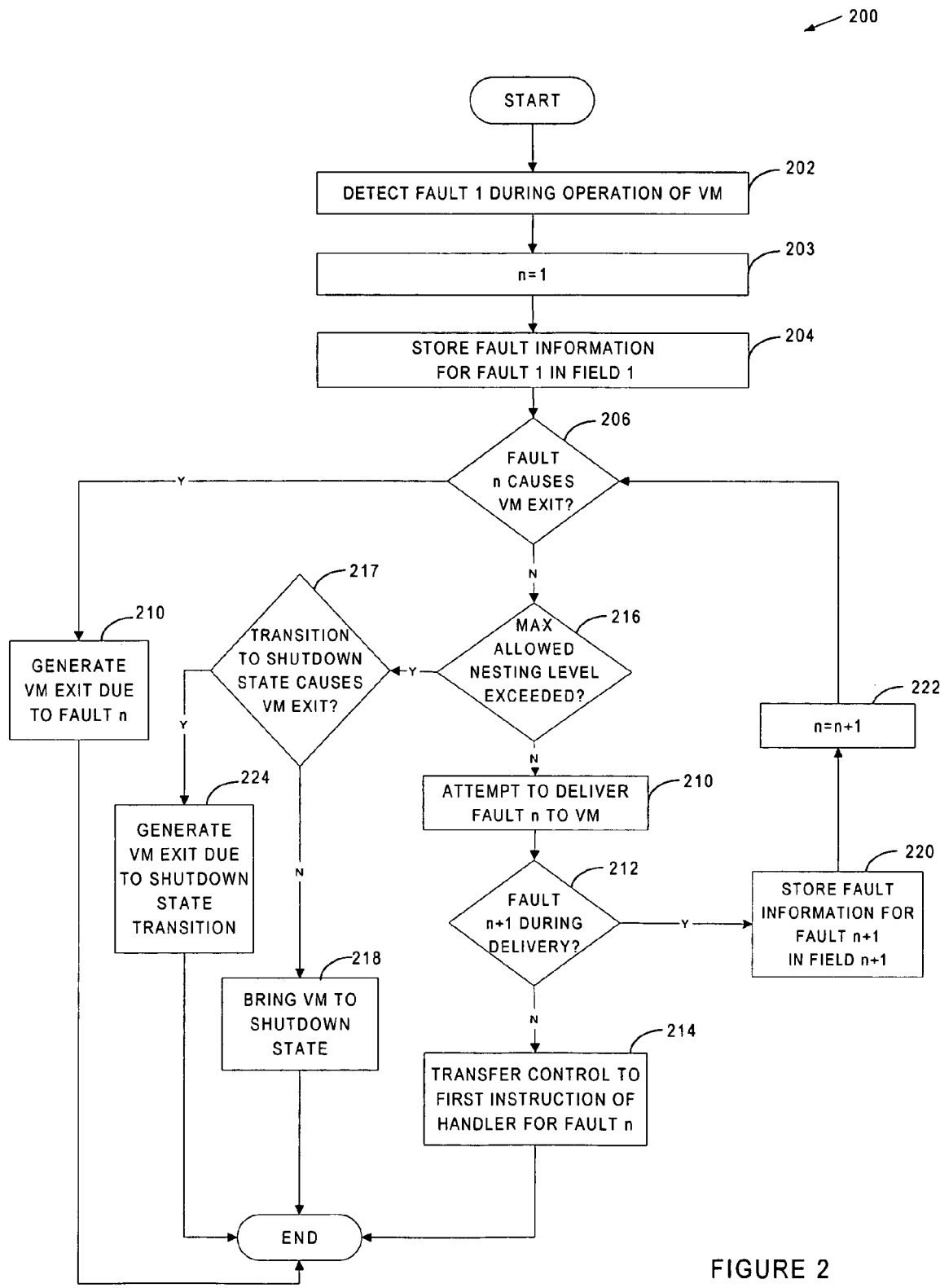
FIGS. 2 and 3 are flow diagrams of two embodiments of a process for providing support for nested faults in a virtual machine environment.

FIG. 2 is a flow diagram of an embodiment of a process for providing support for nested faults in a virtual machine environment. The process may be performed by processing logic that may comprise hardware (e.g., circuitry, dedicated logic, programmable logic, microcode, etc.), software (such as that run on a general purpose computer system or a dedicated machine), or a combination of both. In one embodiment, the process is performed by nested fault logic 122 of FIG. 1.

Referring to FIG. 2, process 200 begins with processing logic detecting an initial fault (referred to as fault 1) during operation of a VM (processing block 202). Faults detected during operation of a VM may be exceptions (e.g., page faults, general protection faults, a trap, an abort, etc.), interrupts (e.g., a hardware interrupt, a software interrupt, etc.), or a variety of platform events (e.g., INIT, an SMI, etc.). Processing logic initializes a variable n to 1 to track the fault nesting level (processing block 203). At processing block 204, processing logic stores fault information pertaining to the initial fault (i.e., fault 1; n=1) in fault information field 1 (i.e., field n). The fault information pertaining to this initial fault, or any other fault discussed herein, includes information identifying the fault such as a fault identifier and a fault type (e.g., external interrupt, internal interrupt, NMI, exception, etc.) and, in one embodiment, also an error code and/or other information associated with the fault. In another embodiment, processing logic does not store the information pertaining to the initial fault in the fault information field 1 until a second fault is detected. Rather, processing logic stores the information pertaining in a temporary storage location (e.g., in memory, in a processor register or in another location) prior to detecting the second fault.

At decision block 206, processing logic determines whether fault n is associated with a VM exit (i.e., a corresponding execution control indicator is set to a VM exit value to require that fault n cause a VM exit). If fault n is associated with a VM exit, processing logic generates a VM exit (processing block 210). The determination may be based on the fault identifier (i.e., the fault vector), an error code associated with the fault, one or more indicators or fields in the VMCS, etc.

If fault n is not associated with a VM exit, processing logic determines whether the nesting level associated with fault n (i.e., nesting level n) exceeds a maximum allowed nesting level (decision box 216). If the maximum allowed nesting level has been exceeded, processing logic determines if a transition to shutdown state is configured to cause a VM exit (decision box 217). If so, processing logic generates a VM exit, informing the VMM that the VM exit was caused by a pending transition to the shutdown state (processing block 224). If a transition to shutdown state is not configured to cause a VM exit, processing logic brings the VM to shutdown state (processing block 218). In another embodiment, a pending transition to shutdown state unconditionally causes a VM exit. In yet another embodiment, a transition to shutdown state never causes a VM exit, in which case, the VM always enters the shutdown state if the maximum allowed nesting level is exceeded.

If (as determined in decision box 216) the maximum allowed nesting level has not been exceeded, processing logic attempts to deliver fault n to the VM (processing block 210) and determines whether any new fault (fault n+1) occurs during the delivery of fault n (decision box 212).

If no new fault occurs during the delivery of fault n, processing logic transfers control to the first instruction of the handler associated with fault n (processing block 214). Alternatively, if fault n+1 occurs during the delivery of fault n, then processing logic stores fault information for fault n+1 in field n+1 (processing block 220). Further, processing logic increments n by 1 (processing block 222) and returns to decision box 206.

Accordingly, process 200 captures and stores information for nested faults occurring at any allowed nesting levels. Information about all faults encountered is stored in one or more fault information fields.

Figure 3:
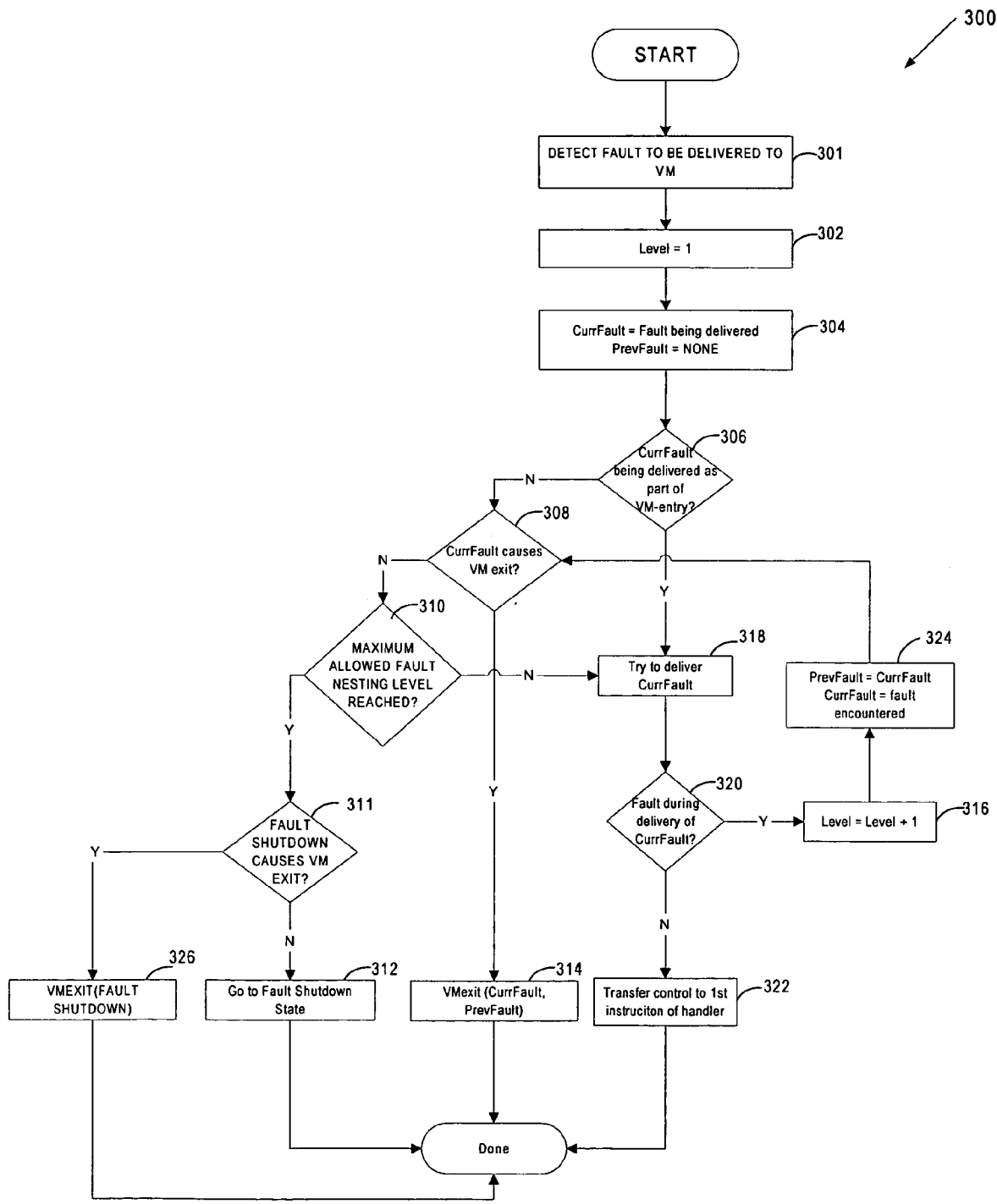

FIG. 3 is a flow diagram of one embodiment of a process 300 for supporting nested faults in a virtual-machine environment. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 300 is performed by nested fault logic 122 of FIG. 1.

Referring to FIG. 3, process 300 begins with processing logic determining that a fault needs to be delivered to a VM (processing block 301). Processing logic initializes a level counter to 1 (processing block 302). Processing logic then stores fault information for the current fault being delivered in a current fault information field and initializes a previous fault information field to indicate that no previous fault was encountered (processing block 304). The initialization of the previous fault field may, for example, clear a bit indicating that the fault information field is valid. Alternatively, any other encoding can be used to indicate that no fault information is included in the field.

Next, processing logic determines whether the current fault is being delivered as part of a VM entry (decision box 306). If not, processing logic determines whether the current fault is configured to cause a VM exit (decision box 308). In one embodiment, this determination is made by consulting one or more execution controls in the VMCS. If the current fault causes a VM exit, processing logic generates a VM exit (processing block 314). In one embodiment, as part of the VM exit, processing logic provides the current fault information and previous fault information fields to the VMM. In an embodiment, these fault information fields are included in the VMCS that is accessible to the VMM. The fault information fields may be made available to the VMM through any mechanism known in the art (e.g., one or more registers or memory locations).

If the current fault does not cause a VM exit, processing logic determines whether the level counter is equal to the maximum allowed nesting level (decision box 310). This determination is made using the level variable (initialized in processing block 302 and incremented in processing block 316). For example, in the IA-32 ISA, the maximum allowed fault nesting level is 3. If the maximum fault nesting level has been reached, processing logic determines if a transition to a fault shutdown state causes a VM exit (processing box 311). This determination may be made, in an embodiment, by consulting one or more execution controls in the VMCS. If a VM exit is indicated, processing logic causes a VM exit to the VMM, indicating that the VM exit was caused by a pending transition to the fault shutdown state (processing block 326). If a VM exit is not indicated, processing logic brings the VM to a fault shutdown state (processing block 312). In another embodiment, a pending transition to shutdown state unconditionally causes a VM exit. In yet another embodiment, a transition to shutdown state never causes a VM exit, in which case, the VM always enters the shutdown state if the maximum allowed nesting level is exceeded.

If (as determined in processing box 310) the maximum allowed fault nesting level has not been reached, processing logic tries to deliver the current fault to the VM (processing block 318), and determines whether any new fault occurs during delivery of the current fault (decision box 320). If not, processing logic transfers control to the first instruction of a handler associated with the current fault (processing block 322). If so, processing logic increments the level counter by 1 (processing block 316), moves data from the current fault information field to the previous fault information field (processing block 324) and proceeds to decision box 308.

As described above, in some embodiments, a VMM may, at VM entry, indicate to the processor that a fault should be delivered to the VM as part of VM entry processing. If processing logic determines at decision box 306 that the current fault is being delivered as part of a VM entry, then the current fault cannot cause a VM exit and, therefore, processing logic does not perform the check in processing block 308. Additionally, in the embodiment shown in FIG. 3, the VMM may only inject the initial fault, therefore the check of processing block 310 is not performed if the check at processing box 306 indicates that the initial fault is being delivered as part of VM entry. Rather, processing logic proceeds directly to processing block 318.

Note that some ISAs may not allow for the retention of nested fault information under some circumstances. Additionally, some ISAs may have more complex progressions toward a shutdown state than described in the preceding embodiments of the invention. For example, in the IA-32 ISA, a double fault occurs due to certain combinations of page fault(s) and contributory fault(s). The occurrence of a double fault causes the loss of information of the previous fault(s). A subsequent fault following a double fault may result in a triple fault, which loses information on all previous faults. Certain exceptions in the IA-32 ISA may be classified as benign, in which case, they may not lead to the occurrence of a double or triple fault. Additionally, in the IA-32 ISA, successive machine check exceptions may initiate a transition to shutdown state, but a machine check may not lead to the occurrence of a double or triple fault. Further, the delivery of faults through the IDT may cause a task-switch, which, when the faults occur during the execution of a VM, may, in an embodiment, cause a VM exit to the VMM. The ISA-specific functionality is not reflected in FIG. 2 or FIG. 3.

Figure 4:
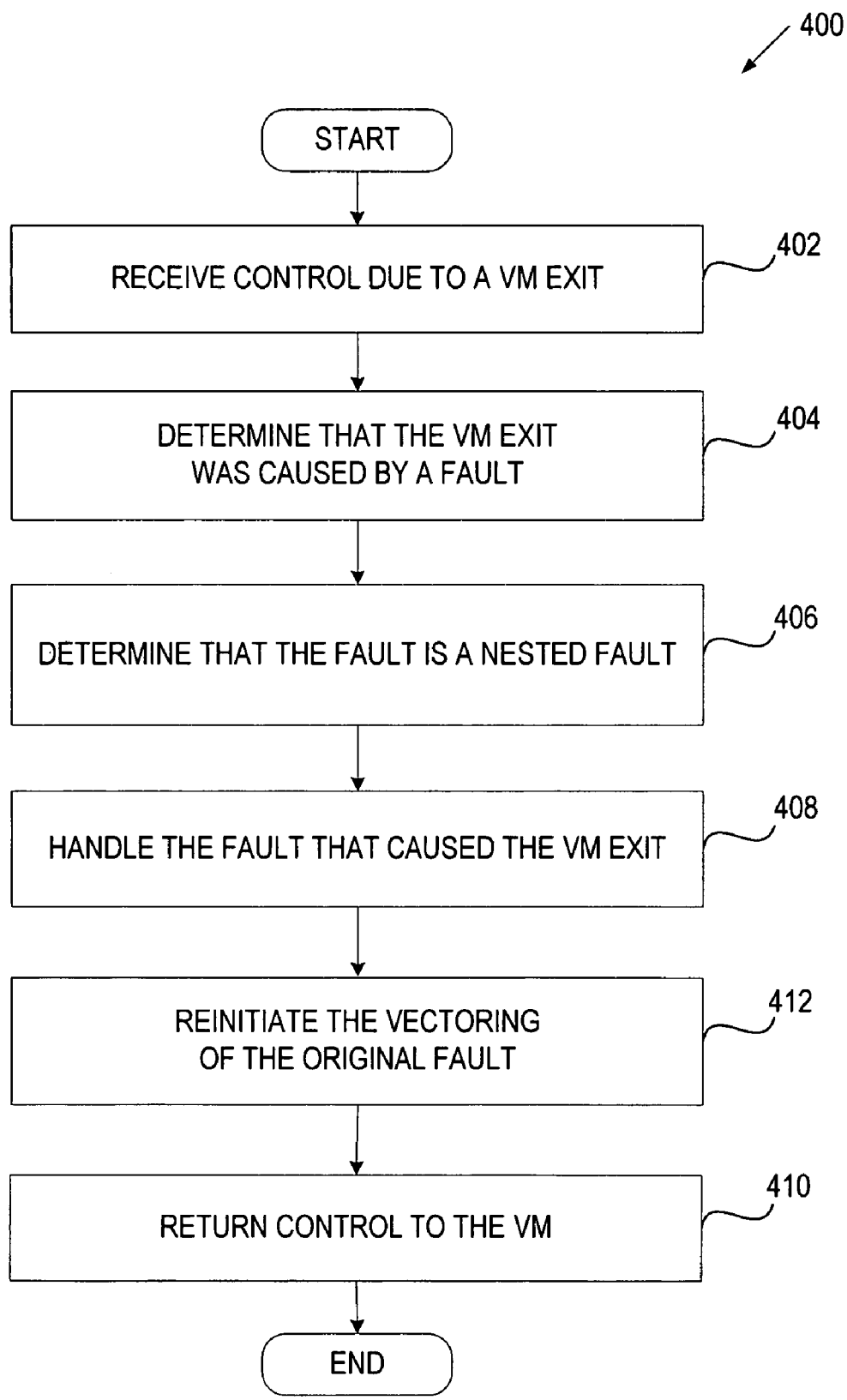
FIG. 4 is a flow diagram of one embodiment of a process for handling nested faults in a virtual-machine environment.

FIG. 4 is a flow diagram of one embodiment of a process 400 for handling nested faults in a virtual-machine environment. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 400 is performed by the VMM 112 of FIG. 1.

Referring to FIG. 4, process 400 begins with processing logic receiving control due to a VM exit (processing block 402). Next, processing logic determines that the VM exit was caused by a fault (processing block 404) and further determines that this fault is a nested fault (i.e., it occurred during the delivery of an original fault) (processing block 406). In an embodiment, these determinations may be made by examining data provided by the processor in exit information fields in the VMCS.

Further, processing logic handles the fault that caused the VM exit (processing block 408), reinitiates the delivery of the original fault or otherwise emulates the delivery of the original fault to the VM (processing block 412), and returns control to the VM (processing block 410). As described above, the reinitiation of the delivery of the original fault may be performed, for example, by the VMM by emulating the delivery of the fault in software, or by the VMM requesting that the processor perform the delivery of the fault as part of returning control to the guest.

Thus, a method and apparatus for providing support for nested faults in a virtual machine environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting a first fault to be delivered to a virtual machine (VM);
   detecting a second fault while delivering the first fault to the VM;
   determining whether the second fault is associated with a transition of control to a virtual machine monitor (VMM);
   if the second fault is associated with the transition of control to the VMM, storing information pertaining to the first fault in a first field, storing information pertaining to the second fault in a second field, and transitioning control to the VMM; and
   if the second fault is not associated with the transition of control to the VMM, delivering the second fault to the VM.

2. The method of claim 1 wherein the information pertaining to the first fault is stored in any one of a temporary storage location and memory, prior to detecting the second fault.

3. The method of claim 1 wherein the first field and the second field are included in a virtual machine control structure (VMCS).

4. The method of claim 1 wherein:
   the information pertaining to the first fault includes an identifier of the first fault; and
   the information pertaining to the second fault includes an identifier of the second fault.

5. The method of claim 4 wherein:
   the information pertaining to the first fault further includes an error code associated with the first fault; and
   the information pertaining to the second fault further includes an error code associated with the second fault.

6. The method of claim 1 further comprising:
   if the second fault is not associated with the transition of control to the VMM, determining whether a current nesting level exceeds a maximum allowed nesting level; and
   if the current nesting level exceeds the maximum allowed nesting level, transitioning control to the VMM upon determining that a transition to a shutdown state is associated with the transition of control to the VMM.

7. The method of claim 1 further comprising:
   determining whether the first fault is associated with a transition of control to the VMM; and
   if the first fault is associated with the transition of control to the VMM, refraining from delivering the first fault to the VM, storing information pertaining to the first fault in the first field, and transitioning control to the VMM.

8. The method of claim 1 wherein determining whether the first fault is associated with a transition of control to the VMM is performed upon determining that the delivery of the first fault is not part of a transition of control to the VM.

9. The method of claim 1 further comprising:
   detecting a third fault while delivering the second fault to the VM; and
   if the third fault is associated with a transition of control to the VMM, storing information pertaining to the first fault in the first field, storing information pertaining to the second fault in the second field, storing information pertaining to the third fault in a third field, and transitioning control to the VMM.

10. The method of claim 1 further comprising:
    detecting a third fault while delivering the second fault to the VM; and
    if the third fault is associated with a transition of control to the VMM, storing information pertaining to the second fault in the first field, storing information pertaining to the third fault in the second field, and transitioning control to the VMM.

11. The method of claim 9 further comprising:
    prior to delivering the second fault to the VM, determining that a current nesting level does not exceed a maximum allowed nesting level.

12. The method of claim 11 further comprising:
    if the current nesting level exceeds the maximum allowed nesting level, bringing the VM to a shutdown state.

13. An apparatus comprising:
    a virtual machine monitor (VMM);
    a data structure controlled by the VMM, the data structure having a first field and a second field; and
    fault delivery logic to store information pertaining to a first fault occurring during operation of a virtual machine (VM) in the first field, to store information pertaining to a second fault detected while delivering the first fault to the VM in the second field, to transition control to the VMM if the second fault is associated with the transition of control to the VMM, and to deliver the second fault to the VM if the second fault is not associated with the transition of control to the VMM.

14. The apparatus of claim 13 wherein the data structure is a virtual machine control structure (VMCS).

15. The apparatus of claim 13 wherein:
    the information pertaining to the first fault includes an identifier of the first fault; and
    the information pertaining to the second fault includes an identifier of the second fault.

16. The apparatus of claim 15 wherein:
    the information pertaining to the first fault further includes an error code associated with the first fault; and
    the information pertaining to the second fault further includes an error code associated with the second fault.

17. The apparatus of claim 13 wherein the fault delivery logic is further to determine whether the first fault is associated with a transition of control to the VMM, and if the first fault is associated with the transition of control to the VMM, to refrain from delivering the first fault to the VM, to store information pertaining to the first fault in the first field, and to transition control to the VMM.

18. The apparatus of claim 13 wherein the fault delivery logic is to determine whether the first fault is associated with a transition of control to the VMM upon determining that the delivery of the first fault is not part of a transition of control to the VM.

19. The apparatus of claim 13 wherein the fault delivery logic is further to detect a third fault while delivering the second fault to the VM, and if the third fault is associated with a transition of control to the VMM, to store information pertaining to the first fault in the first field, to store information pertaining to the second fault in the second field, to store information pertaining to the third fault in a third field of the data structure, and to transition control to the VMM.

20. The apparatus of claim 13 wherein the fault delivery logic is further to detect a third fault while delivering the second fault to the VM, and if the third fault is associated with a transition of control to the VMM, to store information pertaining to the second fault in the first field, to store information pertaining to the third fault in the second field, and to transition control to the VMM.

21. The apparatus of claim 19 wherein the fault delivery logic is to determine that a current nesting level does not exceed a maximum allowed nesting level prior to delivering the second fault to the VM.

22. The apparatus of claim 21 wherein the fault delivery logic is further to bring the VM to a shutdown state if the current nesting level exceeds the maximum allowed nesting level.

23. A system comprising:
a memory to store guest software; and
a processor, coupled to the memory, to store information pertaining to a first fault occurring during operation of a virtual machine (VM) in a first field, to detect a second fault while delivering the first fault to the VM, to determine whether the second fault is associated with a transition of control to a virtual machine monitor (VMM), if the second fault is associated with the transition of control to the VMM, to store information pertaining to the second fault in a second field and to transition control to the VMM, and if the second fault is not associated with the transition of control to the VMM, delivering the second fault to the VM.

24. The system of claim 23 wherein:
the information pertaining to the first fault includes an identifier of the first fault; and
the information pertaining to the second fault includes an identifier of the second fault.

25. The system of claim 23 wherein:
the information pertaining to the first fault further includes an error code associated with the first fault; and
the information pertaining to the second fault further includes an error code associated with the second fault.

26. A machine-readable medium containing instructions which, when executed by a processing system, cause the processing system to perform a method, the method comprising:
storing information pertaining to a first fault occurring during operation of a virtual machine (VM) in a first field;
detecting a second fault while delivering the first fault to the VM;
determining whether the second fault is associated with a transition of control to a virtual machine monitor (VMM);
if the second fault is associated with the transition of control to the VMM, storing information pertaining to the second fault in a second field, and transitioning control to the VMM; and
if the second fault is not associated with the transition of control to the VMM, delivering the second fault to the VM.

27. The machine-readable medium of claim 26 wherein:
the information pertaining to the first fault includes an identifier of the first fault; and
the information pertaining to the second fault includes an identifier of the second fault.

28. The machine-readable medium of claim 26 wherein:
the information pertaining to the first fault further includes an error code associated with the first fault; and
the information pertaining to the second fault further includes an error code associated with the second fault.

* * * * *